US010177505B2

(12) United States Patent
Tanaka et al.

(10) Patent No.: US 10,177,505 B2
(45) Date of Patent: Jan. 8, 2019

(54) PROTECTION ELEMENT

(71) Applicant: LITTELFUSE JAPAN G.K., Kanagawa (JP)

(72) Inventors: Arata Tanaka, Kanagawa (JP); Masaaki Iwai, Kanagawa (JP); Toshiya Ikeno, Kanagawa (JP); Tsuyoshi Takizawa, Kanagawa (JP)

(73) Assignee: LITTELFUSE JAPAN G.K., Tokyo (JP)

( * ) Notice: Subject to any disclaimer, the term of this patent is extended or adjusted under 35 U.S.C. 154(b) by 0 days.

(21) Appl. No.: 15/509,653

(22) PCT Filed: Sep. 8, 2015

(86) PCT No.: PCT/JP2015/075387

§ 371 (c)(1),
(2) Date: Mar. 8, 2017

(87) PCT Pub. No.: WO2016/039305

PCT Pub. Date: Mar. 17, 2016

(65) Prior Publication Data

US 2017/0244201 A1 Aug. 24, 2017

(30) Foreign Application Priority Data

Sep. 9, 2014 (JP) ................................ 2014-183438

(51) Int. Cl.
*H02H 5/04* (2006.01)
*H01R 13/66* (2006.01)
(Continued)

(52) U.S. Cl.
CPC ........... *H01R 13/6616* (2013.01); *H01C 1/12* (2013.01); *H01C 1/1406* (2013.01); *H01C 7/02* (2013.01);
(Continued)

(58) Field of Classification Search
CPC ...................................................... H01H 5/047
(Continued)

(56) References Cited

U.S. PATENT DOCUMENTS 4,258,569 A * 3/1981 Buchy ...................... G01K 7/12 219/494
5,877,672 A * 3/1999 Tsuda .................. H01C 1/1406 338/22 R
(Continued)

FOREIGN PATENT DOCUMENTS

EP 2306469 A1 4/2011
JP 1055902 A 2/1988
(Continued)

OTHER PUBLICATIONS

Extended European Search Report and European Search Opinion, dated Jul. 26, 2018, for EP Application No. 15839335.5.

*Primary Examiner* — Phuong Dinh

(57) ABSTRACT

A protective element including (i) a PTC element having an opening passing through in the thickness direction, and (ii) a first electrode and a second electrode positioned on both main surfaces of the PTC element, the protective element characterized in that the first electrode extends from a main surface of the PTC element over an edge thereof and into the opening wherein the PTC element is not prevented from expanding even when secured by a screw or caulking.

8 Claims, 6 Drawing Sheets

(51) Int. Cl.

| | |
|---|---|
| ***H01C 7/02*** | (2006.01) |
| ***H01R 24/58*** | (2011.01) |
| ***H01C 1/12*** | (2006.01) |
| ***H01C 1/14*** | (2006.01) |
| *H01R 103/00* | (2006.01) |
| *H01C 1/01* | (2006.01) |

(52) U.S. Cl.
CPC ............... *H01R 24/58* (2013.01); *H01C 1/01* (2013.01); *H01R 2103/00* (2013.01)

(58) Field of Classification Search
USPC .............. 361/103, 105; 337/398; 439/620.08
See application file for complete search history.

(56) References Cited

U.S. PATENT DOCUMENTS

| | | | | |
|---|---|---|---|---|
| 5,982,253 | A * | 11/1999 | Perrin .................... | B60N 2/448 333/182 |
| 8,508,328 | B1 | 8/2013 | Chen et al. | |
| 8,519,816 | B2 * | 8/2013 | Takeda ................... | H01H 37/14 337/102 |
| 2011/0043321 | A1 | 2/2011 | Takeda | |

FOREIGN PATENT DOCUMENTS

| | | | |
|---|---|---|---|
| JP | 63122201 | A | 5/1988 |
| JP | 2009-074795 | A | 4/2009 |
| JP | 2011-152895 | A | 8/2011 |
| KR | 1020050060187 | A | 6/2005 |
| KR | 1020120050636 | A | 5/2012 |

* cited by examiner

[FIG. 1]
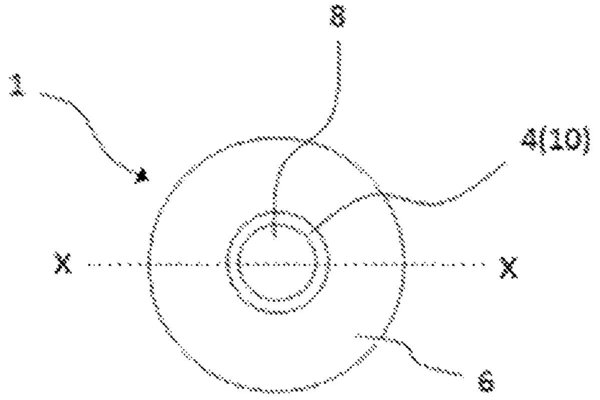
[FIG. 2]
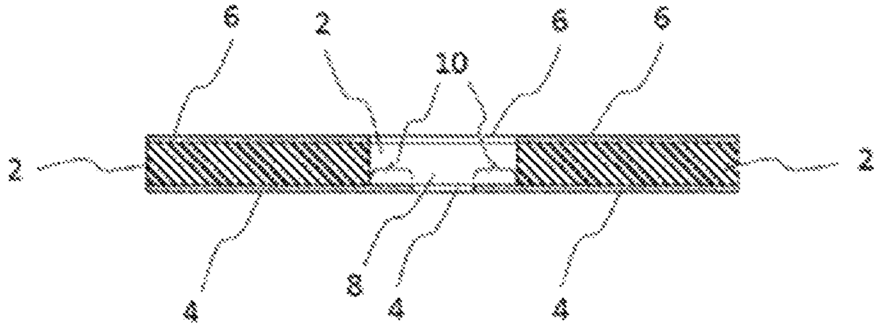

[FIG. 3]
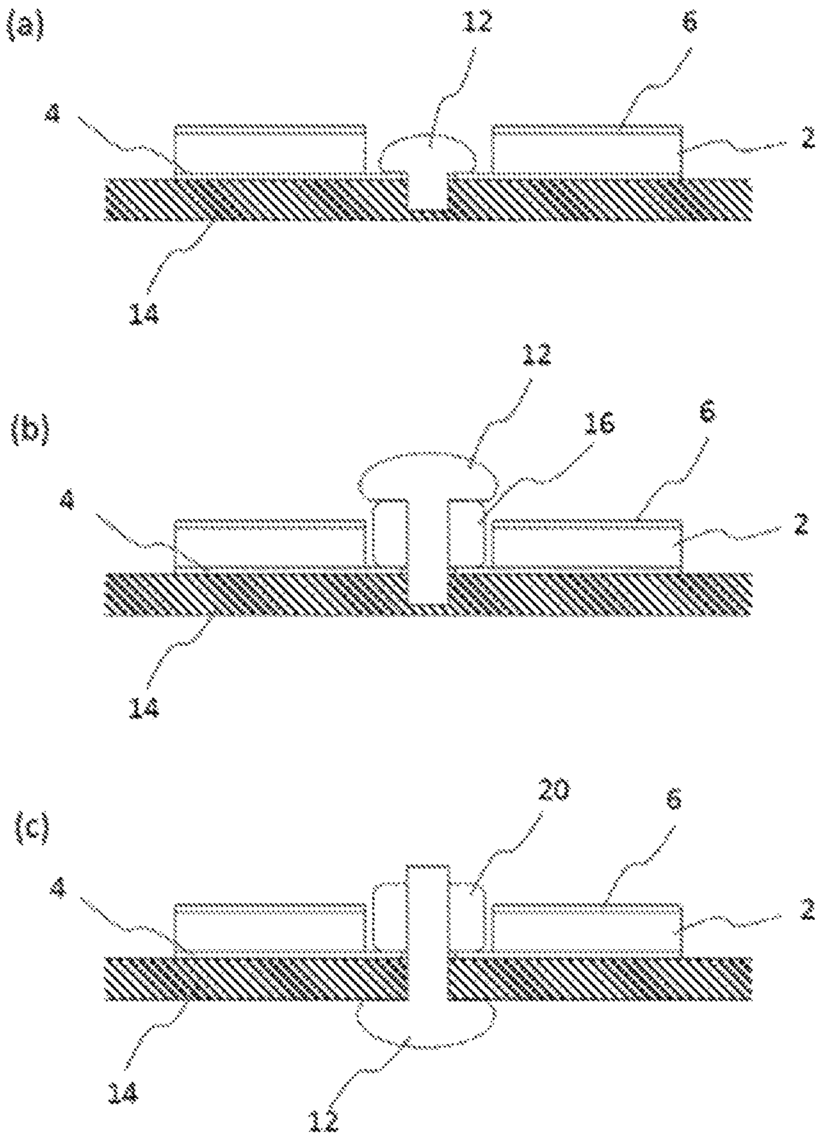

[FIG. 4]
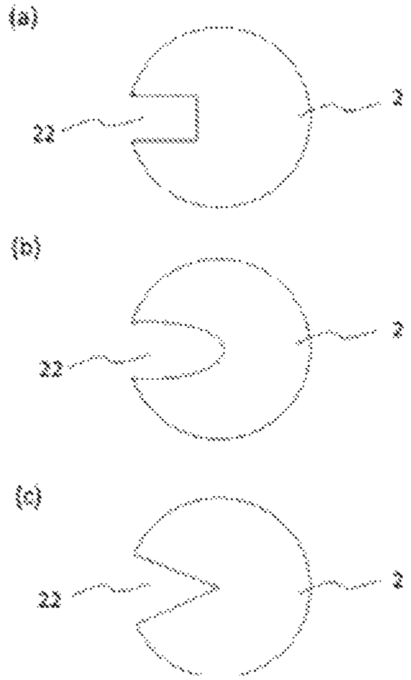

[FIG. 5]
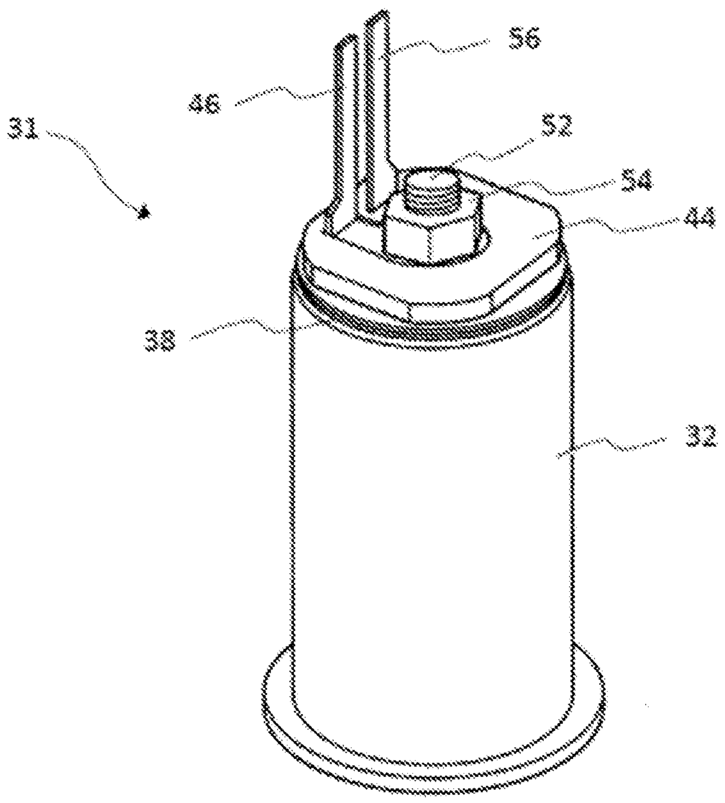

[FIG. 6]
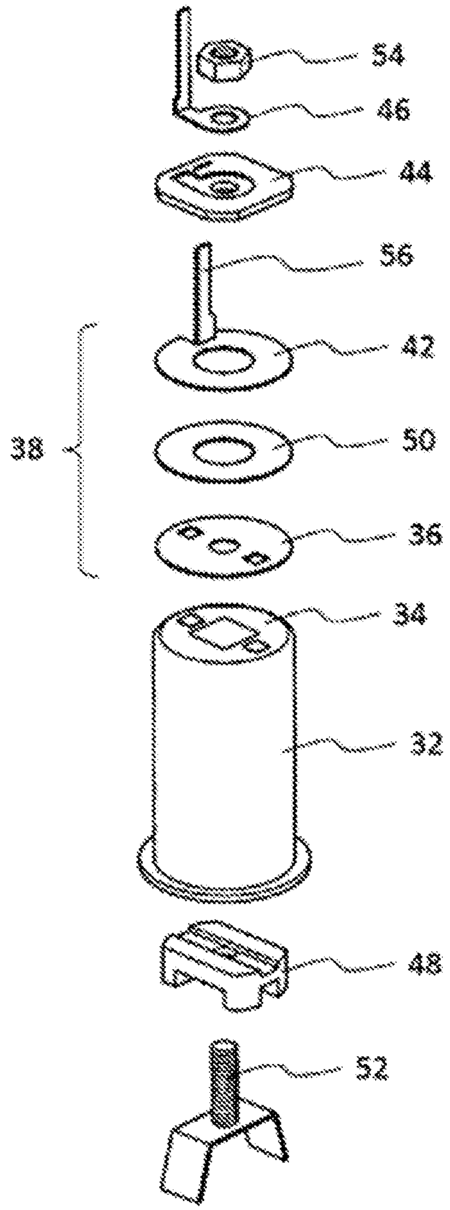

[FIG. 7]
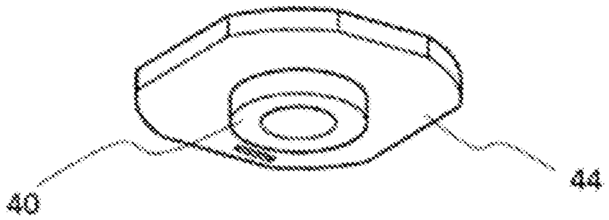

PROTECTION ELEMENT

The present invention relates to a protective element.

BACKGROUND OF THE INVENTION

Field of the Invention

When an abnormality occurs in an electronic device or an electrical device such as excess current being supplied to the device or the device reaching an abnormally high temperature, various types of protective elements are used to cut the flow of electrical current to the electronic device or electrical device. These protective elements include bimetal elements, temperature fuse elements, and positive temperature coefficient (PTC) elements.

As the functionality and versatility of electronic devices and electrical devices has increased, so too has the amount of power used by these devices and the amount of power supplied to these devices. For example, the cigarette lighter socket in vehicles is increasingly used as a power socket. Because the power used by these electronic devices and electrical devices has increased, the power supplied via the cigarette light socket has increased to 120 W.

Description of Related Art

JP 2009-074795 A; P 2011-152895 A

SUMMARY OF THE INVENTION

Bimetal elements (see Patent Document 1) and temperature fuse elements (see Patent Document 2) are commonly used in cigarette lighter sockets for overcurrent protection. However, as bimetal elements supply more power and are used more frequently, the contact points in the bimetal element deteriorate and no longer function as intended. As the amount of supplied power increases, temperature fuse elements melt more readily. However, the melt point of the temperature fuse element is higher than the melt point of the resin constituting the cigarette lighter socket, and there is a risk that the resin surrounding the cigarette socket will melt before the temperature fuse.

In order to avoid these problems, the present inventors conducted research on the use of disk-shaped polymer PTC elements as protective elements for cigarette lighter sockets. Because polymer PTC elements, unlike bimetal elements, do not have mechanical contacts, they do not deteriorate functionally after repeated operation (tripping). Because the resistance temperature characteristics can be changed relatively freely, they can operate at a temperature lower than the melt point of the resin constituting the cigarette lighter socket.

However, when a disk-shaped polymer PTC element is secured in a cigarette lighter socket using a screw (bolt) or caulking, pressure is applied to the polymer PTC element, and the PTC element is prevented from expanding. As a result, the element may not function properly or may become damaged.

Therefore, it is an object of the present invention to provide a protective element in which the PTC element is not prevented from expanding even when the element is secured using a screw or caulking.

As a result of continued research, the present inventors discovered that they could solve this problem by securing the entire polymer PTC element to the target (a board or, more specifically, a cigarette lighter socket) by extending an electrode positioned on a main surface of the PTC element to a region in which the PTC element is not present and then attaching this extended portion to the target. The present invention is a product of this discovery.

A first aspect of the present invention provides a protective element comprising (i) a PTC element having an opening passing through in the thickness direction, and (ii) a first electrode and a second electrode positioned on both main surfaces of the PTC element, the protective element characterized in that the first electrode extends from a main surface of the PTC element over an edge thereof and into the opening.

A second aspect of the present invention provides a socket for an electrical device or an electronic device such as a cigarette lighter socket including this protective element.

In the present invention, the electrode on a main surface of the polymer PTC element is extended into the opening so as to have a region in which the polymer PTC element is not present, and to use the extended region to secure the protective element with a screw or caulking so as not to apply pressure to the PTC element. When the protective element is attached in a region in which the PTC element is not present, the attaching force is not substantially applied to the PTC element and the PTC element can function as intended without expansion of the PTC element being prevented during tripping.

BRIEF DESCRIPTION OF SEVERAL VIEWS OF THE DRAWINGS

FIG. 1 is a top view of the protective element 1 in an embodiment of the present invention as viewed from the second electrode 6.

FIG. 2 is a cross-sectional view of the protective element 1 in the thickness direction along line x-x in FIG. 1.

FIG. 3 (*a*) is a cross-sectional view showing the protective element 1 in FIG. 1 secured to another electrical element 14, and FIG. 3 (*b*) and FIG. 3 (*c*) are cross-sectional views showing the protective element secured using other methods.

FIG. 4 (*a*) through FIG. 4 (*c*) are top views of PTC elements having a cut-out portion.

FIG. 5 is a perspective view of the socket 31 in another embodiment of the present invention.

FIG. 6 is an exploded perspective view of the socket 31 in FIG. 5 showing the various elements separated from each other.

FIG. 7 is a perspective view of the insulative spacer 44 in the socket 31 of FIG. 5 as viewed from below.

DETAILED DESCRIPTION

The following is a detailed explanation of the protective element in an embodiment of the present invention with reference to the drawings.

The protective element 1 in the embodiment of the present invention has the structure shown in FIG. 1 and FIG. 2. More specifically, the protective element 1 has a PTC element 2, a first electrode 4, and a second electrode 6 which are layered and ring-shaped. In other words, each element has an opening passing through the element in the thickness direction, the center of the round opening in the first electrode 4 and the second electrode 6 is positioned so as to be aligned with the center of the opening in the PTC element 2 in the axial direction, and the first electrode 4, the PTC element 2, and the second electrode 6 are stacked on each other in this order. In other words, the three round openings in FIG. 1 form concentric circles.

The inner diameter of the first electrode 4 is smaller than the inner diameter of the PTC element 2 and the second electrode 6 (the inner diameter here being the inner diameter of the round opening on the inside of the ring). Therefore, in the protective element 1, the first electrode 4 has a region (extended portion) 10 which extends beyond the edge of the main surface of the PTC element 2 and into the opening 8 in the PTC element 2. The second electrode 6 does not extend beyond the edge of the PTC element and into the opening 8. Thus, as shown in FIG. 1, the extended portion 10 of the first electrode 4 in the opening of the PTC element 2 can be seen when the protective element 1 is viewed from the second electrode 6 side.

As shown in FIG. 3 (*a*), the protective element 1 can be secured to another element such as a substrate or electrical element 14 using securing means such as a screw (or bolt) 12. Here, the screw 12, the PTC element 2, and the second electrode 6 are secured so as not to make contact. As a result, the first electrode 4, the inner wall surface of the PTC element 2, and the second electrode 6 are not connected electrically by the screw. Therefore, the inner diameter of the first electrode is greater than the diameter of the screw and smaller than the diameter of the head portion of the screw, and the inner diameter of the PTC element 2 and the second electrode 6 is greater than the diameter of the head portion of the screw. A screw made of an insulative material (such as a resin) may also be used to prevent an electrical connection between the first electrode 4, the inner wall surface of the PTC element 2, and the second electrode 6. When secured in this manner, the pressure used to secure the element is applied only to the first electrode 4 and not to the PTC element 2.

In another method, as shown in FIG. 3 (*b*), a cylindrical insulative element 16 is provided as an insulative spacer (having an opening for receiving the screw) which is arranged in the openings of the PTC element 2 and the second electrode 6. The protective element 1 is secured via the insulative element 16 so that the PTC element 2 can be secured while preventing an electrical connection between the first electrode 4, the inner wall surface of the PTC element 2, and the second electrode 6. When secured in this manner, the pressure used to secure the element is applied only to the first electrode 4 and not to the PTC element 2.

In another method, as shown in FIG. 3 (*c*), the element is secured by a bolt (screw) 12 inserted from the side of the other electrical element 14 and by a nut 20 fitted in the openings of the PTC element 2 and the second electrode 6. Here, as in the aspect shown in FIG. 3 (*a*), either the nut 20 is arranged so as not to make contact with the PTC element 2 and the second electrode 6 or a nut made of an insulative material is used to prevent an electrical connection between the first electrode 4, the inner wall surface of the PTC element 2, and the second electrode 6 via the nut 20. The bolt and nut may also be secured via an insulative spacer as in the aspect shown in FIG. 3 (*b*). When secured in this manner, the pressure used to secure the element is applied only to the first electrode 4 and not to the PTC element 2.

The PTC element used in the present invention may be a ceramic PTC element or a polymer PTC element. However, a polymer PTC element is preferred. Compared to a ceramic PTC element, a polymer PTC element is easier to process, has a lower resistance value, and is less likely to self-destruct above a certain temperature.

Any polymer PTC element common in the art can be used. This element is usually obtained by extruding a conductive composition composed of a conductive filler (carbon black, nickel alloy, etc.) dispersed in a polymer (polyethylene, polyvinylidene fluoride, etc.) and then cutting the extruded product to a predetermined size. In one aspect, the PTC element may be a so-called polymer PTC element having a thin laminated electrode (foil electrode) on at least one main surface.

There are no particular restrictions on the outer diameter of the PTC element 2, which may be selected depending on the intended use. Examples include from 5 mm to 100 mm, from 10 mm to 50 mm, and from 15 mm to 25 mm.

There are no particular restrictions on the inner diameter of the PTC element 2 as long as it is greater than the inner diameter of the first electrode. For example, it can be from 1 mm to 10 mm, and preferably from 3 mm to 8 mm.

There are no particular restrictions on the thickness of the PTC element 2, which can be from 0.01 to 5 mm, preferably from 0.05 mm to 3 mm, and more preferably from 0.1 mm to 1 mm.

The PTC element 2 shown in FIG. 1 and FIG. 2 is ring-shaped, but the PTC element used in the present invention does not have to be ring-shaped. It can be any shape able to achieve the object of the present invention. For example, the shape of the outer contour and the inner contour (that is, the opening) of the PTC element can be round, but combined with another shape such as an oval or a polygon (triangle, square, pentagon, etc.). The opening in the PTC element does not have to be in the center of the PTC element. It can be, for example, in the outer peripheral portion of the PTC element.

In the present invention, the opening in the PTC element may conceivably include a cut-out portion. In another aspect, the opening may be a cut-out portion. There are no particular restrictions on the shape and size of the cut-out portion as long as the object of the present invention can be achieved. For example, the cut-out portion may have one of the shapes shown in FIG. 4 (*a*) through (*c*) (denoted by reference number 22 in FIG. 4). When the PTC element is viewed from above, the PTC element may have an opening with closed contours as shown in FIG. 1, or the PTC element may have an opening with open contours (a cut-out portion) as shown in FIG. 4. When the opening is a cut-out portion, the protective element of the present invention can be removed merely by loosening the screw. In other words, the screw does not have to be completely removed.

The PTC element may have a single opening as shown in the drawings, or may have multiple openings, such as 2, 3, or 4 openings.

There are no particular restrictions on the outer diameter of the first electrode 4. Examples include from 5 mm to 100 mm, from 10 mm to 50 mm, and from 15 mm to 25 mm. Preferably, the outer diameter of the first electrode 4 is the same as the outer diameter of the PTC element 2.

There are no particular restrictions on the inner diameter of the first electrode 4 as long as it is smaller than the inner diameter of the PTC element 2. For example, it can be from 0.8 mm to 8 mm, and preferably from 2 mm to 6 mm.

The first electrode 4 may be plate-shaped or lead-shaped and be thick enough to provide sufficient rigidity when the protective element of the present invention is secured. There are no particular restrictions on the thickness of the first electrode 4, which can be from 0.1 to 2 mm, and preferably from 0.2 mm to 1 mm.

The first electrode 4 shown in FIG. 1 and FIG. 2 is ring-shaped, but the first electrode used in the present invention does not have to be ring-shaped. It can be any shape able to achieve the object of the present invention. For example, the shape of the outer contour and the inner contour (that is, the opening) of the first electrode can be round, but combined with another shape such as an oval or a polygon (triangle, square, pentagon, etc.). The shape of the first electrode may be the same shape as the PTC element or different. However, it is preferably the same shape except for a smaller opening or cut-out portion.

The first electrode of the present invention preferably covers the entire main surface of the PTC element. However, it may also cover only a portion of the main surface or cover the main surface of the PTC element in multiple locations, such as 2, 3, or 4 separate places. The extended portion from the PTC element may be present along some or all of the outer edge portion of the opening or cut-out portion in the PTC element. For example, it may form a ring shape around the entire outer edge portion of the opening in the PTC element as shown in FIG. 1, or may form an arc shape. There may be two or more extended portions in the opening in the PTC element, such as 2, 3, or 4 extended portions.

There are no particular restrictions on the outer diameter of the second electrode 6. Examples include from 5 mm to 100 mm, from 10 mm to 50 mm, and from 15 mm to 25 mm. Preferably, the outer diameter of the second electrode 6 is the same as the outer diameter of the PTC element 2.

There are no particular restrictions on the inner diameter of the second electrode 6 as long as it is larger than the inner diameter of the first electrode 4. It is preferably the same diameter as the inner diameter of the PTC element 2. For example, it can be from 1 mm to 10 mm, and preferably from 3 mm to 8 mm.

The second electrode 6 shown in FIG. 1 and FIG. 2 is ring-shaped, but the second electrode used in the present invention does not have to be ring-shaped. It can be any shape able to achieve the object of the present invention. For example, the shape of the outer contour and the inner contour (that is, the opening) of the second electrode can be round, but combined with another shape such as an oval or a polygon (triangle, square, pentagon, etc.). The shape of the second electrode may be the same shape as the PTC element or different. However, it is preferably the same shape.

The second electrode of the present invention preferably covers the entire main surface of the PTC element. However, it may also cover only a portion of the main surface or cover the main surface of the PTC element in multiple locations, such as 2, 3, or 4 separate places. The extended portion 10 of the first electrode 1 in the opening of the PTC element 2 can be seen when the protective element 1 is viewed from the second electrode 6 side. However, it may extend from the edge of the PTC element only partially. Preferably, the entire second electrode is present on the main surface of the PTC element.

The first electrode and second electrode used in the present invention may have a connecting portion such as a lead or terminal connected to another electrical element and/or positioning protrusions, recesses, or holes. In another aspect, a region may extend outward from the outer contour of the PTC element from the first and/or second electrode, and the region may be used as a terminal or lead.

In the present invention, the first electrode and the second electrode may be made of the same material or different materials. There are no particular restrictions on the materials used to constitute the first electrode and the second electrode as long as these materials are conductive materials.

In the present invention, the first electrode and the second electrode may be composed of two or more conductive material layers, such as conductive metal layers.

There are no particular restrictions on the method used to connect the PTC element to the first electrode and the second electrode. Examples include crimping and bonding using a conductive bonding material. The first electrode or second electrode may also be created by forming a metal layer on the surface of the PTC element by crimping or plating and then connecting another metal layer on top of this metal layer by welding (arc welding, resistance welding, laser welding, etc.) or soldering.

The protective element of the present invention can be mounted on an electronic device or electrical device using a screw or caulking. Compared to welding, soldering, and use of adhesives, this makes it easier to attach and detach the protective element. Also, because the connected portions do not have to be heated, components with low heat resistance can be used. As a result, the present invention can be used as a protective element in a wide variety of electronic devices and electrical devices, including cigarette lighter sockets, vacuum cleaners, and refrigerators.

In a second aspect, the present invention provides a socket including a protective element of the present invention described above.

The following is a detailed explanation of a socket in an embodiment of the present invention with reference to the drawings.

The socket 31 in the embodiment of the present invention has the structure shown in FIG. 5 and FIG. 6. Specifically, the socket 31 comprises a socket main body portion 32, a protective element 38 of the present invention described above provided on an outer bottom surface 34 of the socket main body portion 32 so that the first electrode 36 is electrically connected to the outer bottom surface, an insulative spacer 44 having a protruding portion 40 provided on the second electrode 42 of the protective element 38 so as to be separated from the main surface of the second electrode 42, a terminal 46 provided on the insulative spacer 44, and an insulating member 48 provided on an inner bottom surface of the socket main body portion 32, these being secured by a bolt 52 inserted from the insulating member 48 side to the terminal 46 side so as not to make contact with the protective element 38 and by a nut 54 positioned on the terminal 46 side.

In the socket 31, the terminal 46, (nut 54), and bolt 52 are connected electrically to form a current path. When the terminal 46 is connected electrically to the positive electrode (or negative electrode) of the power supply (not shown), the bolt 52 functions as the positive electrode (or negative electrode) of the socket 31. The electrical connection between the terminal 46 and the bolt 52 can be direct or via the nut 54. Also, the second terminal 42, the PTC element 50, the first electrode 36, and the socket main body portion 32 are connected electrically to form a current path. When the terminal 56 on the second electrode 42 is connected to the negative electrode (or positive electrode) of the power supply, the socket main body 32 functions as the negative electrode (or positive electrode) of the socket 31. The first electrode 36 and the socket main body portion 32 may be connected electrically by direct contact or via another conductive member.

There are no particular restrictions on the shape of the socket main body portion 32, which may be selected depending on the intended use.

Because the socket main body portion 32 functions as a terminal, some or all of the socket main body portion may be made of a conductive material. There are no particular restrictions on the conductive material that is used.

Examples include nickel, stainless steel, iron, copper, aluminum, tin, titanium, and alloys thereof.

The first electrode 36, the second electrode 42, and the PTC element 50 constitute the protective element 38, and this is a protective element of the present invention described above. In the present embodiment, the shape of the protective element 38 corresponds to the shape of the bottom surface of the socket 31. In other words, it is ring-shaped. The first electrode 36 in the protective element 38 may have a protrusion to position the protective element 38 on the socket 31. The second electrode 42 may have a terminal 56 connected, for example, to the power supply.

The insulative spacer 44 is used to electrically separate the protective element 38 from the terminal 46. The insulative spacer 44 has a protruding portion 40 on the bottom surface (FIG. 7), and the protruding portion passes through the opening in the second electrode 42 and the PTC element 50, reaches the first electrode 36, and makes contact with the extended portion of the first electrode 36.

The insulative spacer 44 is held by the protruding portion 40, and the bottom surface portion of the insulative spacer 44 is separated from the second electrode 42. Therefore, the height of the protruding portion 40 of the insulative spacer 44 is greater than the sum total of the thicknesses of the second electrode 42 and the PTC element 50. The difference between the height of the protruding portion of the insulative spacer 44 and the sum total of the thicknesses of the second electrode 42 and the PTC element 50 has to be greater than the increased thickness when the PTC element 50 is tripped, so 10 μm or more is acceptable, 100 μm or more is preferred, and 500 μm or more is especially preferred.

There are no particular restrictions on the material constituting the insulative spacer 44 as long as it is insulative. However, an insulative resin is preferred. There are no particular restrictions on the insulative resin. It can be, for example, a thermoplastic resin or a thermosetting resin. Specific examples include polyethylene, polypropylene, polycarbonate, fluorine-based resins, ABS (acrylonitrile-butadiene-styrene) resin, polycarbonate-ABS alloy resins, PBT (polybutylene terephthalate) resin, and elastomers.

There are no particular restrictions on the shape of the terminal 46, which depends on the other electrical element and the function, such as connecting the element to the power supply. In the present embodiment, the terminal 46 is positioned in a recess in the insulative spacer 44.

The insulating member 48 is used to electrically separate the bolt 52 from the socket main body portion 32.

There are no particular restrictions on the material constituting the insulating member 48 as long as it is insulative. However, an insulative resin is preferred. There are no particular restrictions on the insulative resin. It can be, for example, a thermoplastic resin or a thermosetting resin. Specific examples include polyethylene, polypropylene, polycarbonate, fluorine-based resins, ABS (acrylonitrile-butadiene-styrene) resin, polycarbonate-ABS alloy resins, PBT (polybutylene terephthalate) resin, and elastomers.

There are no particular restrictions on the shape of the insulating member 48 as long as it realizes its function of electrically separating the bolt 52 from the socket main body portion 32.

The bolt (screw) 52 is arranged so as not to make contact with the PTC element 38 and the socket main body portion 32. It is connected electrically to the terminal 46 directly or via the nut 54. The nut 52 functions as a terminal connected to another electrical element.

Because the bolt 52 functions as a terminal, it is made of a conductive material. There are no particular restrictions on the conductive material that is used. Examples include nickel, stainless steel, iron, copper, aluminum, tin, titanium, and alloys thereof.

The material constituting the nut 54 is preferably a conductive material. The same material constituting the bolt 52 can be used.

The present invention was explained above with reference to the drawings, but the present invention is not limited to this explanation. Various modifications are possible.

A protective element of the present invention can be mounted on a wide variety of electronic devices and electrical devices using a screw or caulking in order to serve as a protective element for the electronic device or electrical device.

The invention claimed is:

1. A protective element comprising:

(i) a ring-shaped PTC element having an opening, and (ii) a ring-shaped first electrode having an opening and disposed on a first main surface of the PTC element; and (iii) a ring-shaped second electrode having an opening and disposed on a second main surface of the PTC element opposite the first main surface;

wherein an inner diameter of the first electrode is smaller than an inner diameter of the PTC element, and an inner diameter of the second electrode is equal to or greater than the inner diameter of the PTC element.

2. The protective element according to claim 1, wherein the second electrode is located entirely on the second main surface of the PTC element.

3. The protective element according to claim 1, wherein the PTC element is a polymer PTC element.

4. The protective element according to claim 1, wherein the first electrode entirely covers an edge of the PTC element that defines the opening.

5. A socket comprising:

a socket main body;

a protective element comprising:

(i) a PTC element having a first main surface, an opposing second main surface, and an opening extending between the first main surface and the second main surface; and (ii) a first electrode disposed on the first main surface and a second electrode disposed on the second main surface of the PTC element;

wherein the first electrode extends over an edge of the first main surface of the PTC element and overhangs the opening;

the protective element disposed on an outer bottom surface of the socket main body with the first electrode electrically connected to the outer bottom surface;

an insulative spacer having a protruding portion disposed on the second electrode of the protective element, the protruding portion separating a bottom surface of the insulative spacer from a main surface of the second electrode;

a terminal provided on the insulative spacer;

an insulating member provided on an inner bottom surface of the socket main body; and a bolt extending through the insulating member, the socket main body, the protective component, and the insulative spacer for securing such components together, wherein the bolt does not contact the protective element and the socket main body.

6. The socket according to claim 5, wherein the second electrode is located entirely on the second main surface of the PTC element.

7. The socket according to claim 5, wherein the PTC element is a polymer PTC element.

8. The socket according to claim 5, wherein the first electrode entirely covers an edge of the PTC element that defines the opening.

* * * * *